United States Patent
Sammer et al.

(10) Patent No.: US 7,577,828 B2
(45) Date of Patent: Aug. 18, 2009

(54) SYSTEM AND METHOD FOR INFORMATION HANDLING SYSTEM MANUFACTURE WITH VERIFIED HARDWARE CONFIGURATION

(75) Inventors: Curtis Sammer, Austin, TX (US); Sin-Wei Yee, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 752 days.

(21) Appl. No.: 11/035,910

(22) Filed: Jan. 14, 2005

(65) Prior Publication Data

US 2006/0195208 A1    Aug. 31, 2006

(51) Int. Cl.
*G06F 9/24* (2006.01)
(52) U.S. Cl. .................. 713/1; 713/2; 713/100
(58) Field of Classification Search ............. 713/1, 713/2, 100
See application file for complete search history.

(56) References Cited

U.S. PATENT DOCUMENTS

| | | | |
|---|---|---|---|
| 5,421,006 A | 5/1995 | Jablon et al. .......... 395/575 |
| 6,366,930 B1 | 4/2002 | Parker et al. .......... 707/203 |
| 2002/0091456 A1* | 7/2002 | O'Connor .......... 700/97 |
| 2004/0030880 A1* | 2/2004 | Kitagawa .......... 713/1 |
| 2005/0216420 A1* | 9/2005 | Padole et al. .......... 705/59 |
| 2006/0037012 A1* | 2/2006 | Zomaya et al. .......... 717/168 |

* cited by examiner

*Primary Examiner*—Mark Connolly
*Assistant Examiner*—Paul B Yanchus, III
(74) *Attorney, Agent, or Firm*—Hamilton & Terrile, LLP; Robert W. Holland

(57) ABSTRACT

An information handling system hardware signature based on a verified hardware configuration for the information handling system serves as a reference to confirm the hardware configuration of the information handling system through a manufacture process. For instance, after hardware component testing, the hardware components of the information handling system are queried and compared against the hardware signature to ensure continued compliance with the verified configuration. Similarly, the hardware configuration is confirmed against the hardware signature after loading an image and prior to final test of the assembled information handling system. Comparison of current hardware with the hardware signature throughout the manufacture process ensures compliance with a predetermined hardware configuration without requiring multiple hardware verifications.

14 Claims, 2 Drawing Sheets

SYSTEM AND METHOD FOR INFORMATION HANDLING SYSTEM MANUFACTURE WITH VERIFIED HARDWARE CONFIGURATION

BACKGROUND OF THE INVENTION

1. Field of the Invention

The present invention relates in general to the field of information handling system manufacture, and more particularly to a system and method for information handling system manufacture with verified hardware configuration.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The ability of information handling systems to adapt to various functions in a cost-effective manner has resulted in large part from the wide diversity in price and capability of hardware and software components available to manufacture information handling systems. Individuals and businesses often order information handling systems built-to-order with desired hardware and software components that meet price and capability goals. An information handling system manufacturer typically purchases an inventory of hardware and software components and assembles the information handling systems as specified by a customer's order. Generally, the various components are compatible with each other as long as the firmware, operating system and software are configured with appropriate drivers to support communication between the components. Build-to-order information handling system factories ensure compatibility by building a hard disc drive image having the appropriate drivers for the assembled components and copying the image to a manufactured information handling system once assembly of the components is complete.

One difficulty that can arise in manufacture of an information handling system is that one or more of the hardware and software components are incompatible, resulting failure or substandard performance by the information handling system. To avoid this difficulty, information handling system manufacturers usually verify the hardware configuration of a manufactured information handling system before software is installed. The verified hardware components are also tested for proper operation before installation of the software. Once the software is installed, the complete information handling system is tested for proper operation. The hardware verification, hardware test and completed system final test are time consuming, especially if a failure occurs. Generally, if a hardware component fails during the hardware test, the failed component is replaced and the hardware tests are repeated with the replacement component. If the system operates correctly with the replacement component then the software installation proceeds. However, if the replacement hardware component is incompatible with the hardware manifest, the system typically fails the final test. Failures of systems at the final test delay the manufacturing process and typically also add to the expense of manufacture by requiring a technician to troubleshoot the system and, once the failure is identified, return the system for re-installation of compatible hardware and software. Additional hardware verification after software installation but before the final test can identify incompatibilities, however, the addition of another hardware verification adds time, complexity and increased sustaining effort to the manufacture process. Further, even if a hardware verification identifies an incompatibility at the end of the manufacture process, the mean time to detection of the failure is increased because the system has completed the software install process.

SUMMARY OF THE INVENTION

Therefore a need has arisen for a system and method which identifies hardware verification that becomes defective due to a change in the hardware configuration of an information handling system during manufacture.

In accordance with the present invention, a system and method are provided which substantially reduce the disadvantages and problems associated with previous methods and systems for verification of hardware configuration during information handling system manufacture. A hardware signature is created from verified hardware components and referenced throughout the manufacture of an information handling system to ensure that the actual hardware configuration does not change from the verified hardware configuration. If a change from the verified hardware configuration is detected by a difference between the hardware signature and currently-detected hardware components, then re-verification of the hardware components is performed.

More specifically, an information handling system is assembled from plural components based on a manifest. A hardware verification engine verifies that that assembled components match the components of the manifest. A hardware signature engine creates a hardware signature that lists the verified components and saves the hardware signature to the assembled information handling system. A hardware extended test engine tests the hardware components to identify any faulty components for replacement. After the hardware extended test, a hardware signature compare engine queries the hardware components to create a list of current hardware components, using system calls such as with SMBIOS calls and PCI queries, and compares the current hardware components with the hardware signature to confirm that the current hardware configuration matches the verified configuration. A failure to match the current configuration with the hardware signature returns the information handling system to the hardware verification engine. If the hardware configuration matches the verified configuration, a software image is loaded and then the hardware signature compare engine again confirms that the current hardware configuration matches the verified configuration by reference to the hardware signature. If the current hardware configuration matches the verified hardware configuration, the information handling system continues through final testing, otherwise the system returns to the hardware verification engine.

The present invention provides a number of important technical advantages. One example of an important technical advantage is that information handling system hardware configuration verification remains reliable throughout the information handling system manufacture process. A comparison of a hardware signature stored on the information handling system at hardware verification with actual hardware detected at anytime through the manufacture process determines whether the current hardware configuration matches the configuration at the initial verification. Systems that have had a hardware configuration change, such as due to a failure during hardware testing, have the hardware verification process repeated while systems that match the hardware signature continue with the manufacture process. Reference to the hardware signature before loading the software and before performing the final test reduces mean manufacture time by identifying systems having missing or incorrect hardware before initiating time-consuming manufacturing steps. The use of a hardware signature reduces manufacture time by reducing the need to re-verify hardware configurations to those instances where the current hardware fails to match a hardware signature.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system manufacture with a predetermined hardware configuration is managed by reference to a hardware signature generated from verified assembled components. Comparison of current hardware components with the hardware signature at various stages of manufacture ensures that missing or incorrect components are discovered promptly and efficiently. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
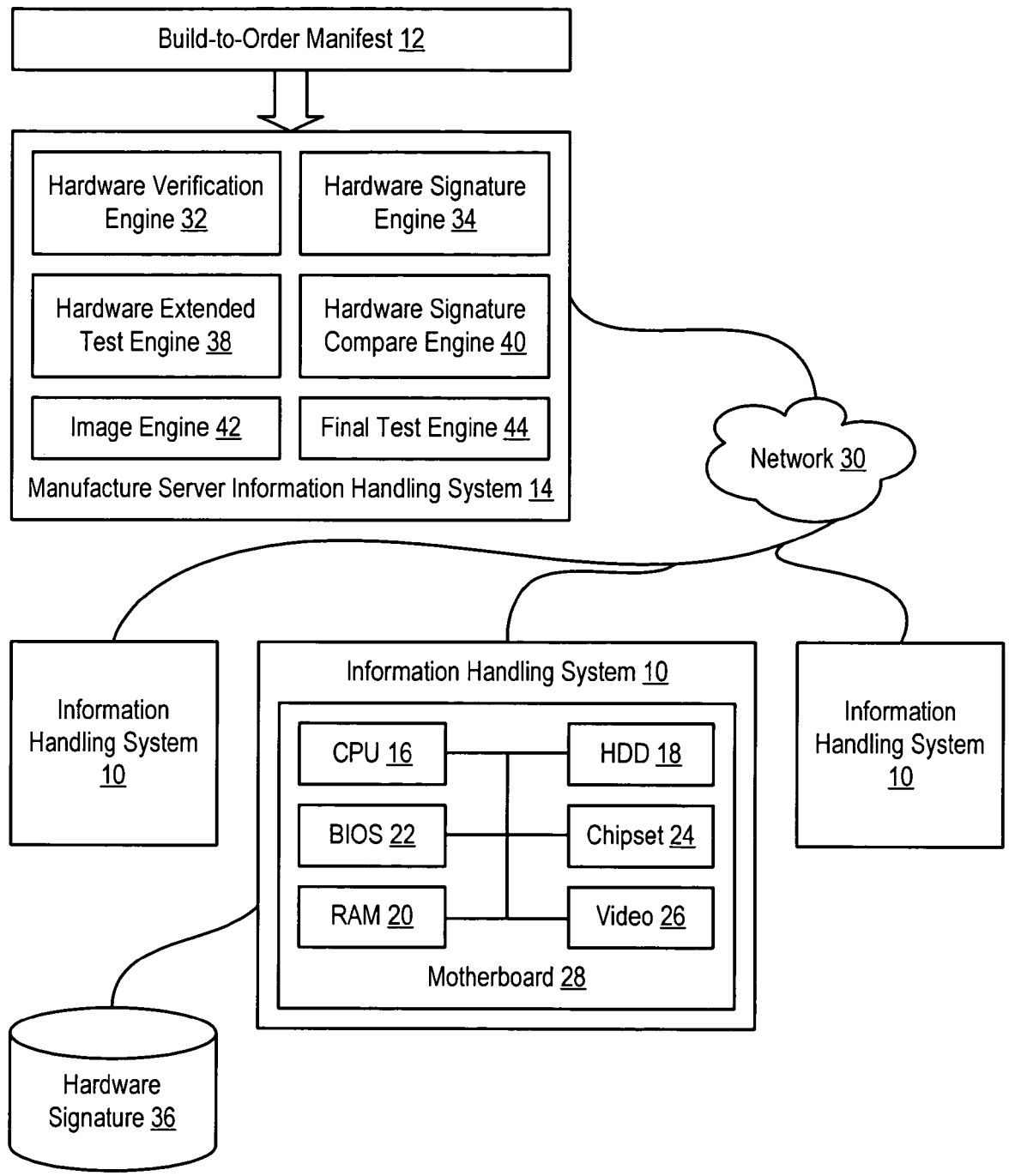
FIG. 1 depicts a block diagram of a system for manufacture of an information handling system by reference to a hardware signature.

Referring now to FIG. 1, a block diagram depicts a system for manufacture of an information handling system 10 by reference to a hardware signature. A build-to-order manifest 12 defines the hardware and software components for plural information handling systems 10 built under the management of a manufacture server information handling system 14. For instance, customers place purchase orders for information handling systems 10 that specify at least certain of the components to be assembled, such as the CPU 16 specified by manufacturer and speed, and that identifies specific parameters for other components, such as the size of the hard disc drive 18 or the size and speed of the RAM 20. Other components that are required for information handling system 10 to run but not specifically identified by manifest 12 may include a BIOS 22, chipset 24, video card 26 and motherboard 28. Build-to-order manifest 12 lists these hardware components with their associated parameters as well as desired software components, such as a selected operating system and selected applications, and is used by assembly workers to assemble hardware components into an information handling system 10.

Once an information handling system 10 is assembled from a build-to-order manifest 12, the information handling system 10 is interfaced with manufacture server information handling system 14 through a network 30 and manifest 12 provides the list of hardware and software components to a hardware verification engine 32 to initiate the manufacture process. Hardware verification engine 32 queries the components of information handling system 10 to verify that each component falls within the defined parameters of build-to-order manifest 12. For instance, hardware verification engine 32 verifies that specifically-identified parts, such as the CPU, are present and that other components match the parameters set forth in manifest 12. If any hardware components are missing or incorrect, hardware verification engine 32 issues a fault to stop the manufacture process. Once the hardware verification is performed, the drivers and other hardware-specific software elements may be determined based on the identification of the actual hardware component used, such as the model of the hard disc drive versus the parameters.

After completion of hardware verification, a hardware signature engine 34 queries the hardware components to generate a hardware signature list of the components. For instance, system calls are made for each component and the response is saved in the hardware signature list. Alternatively, a list of verified hardware components is accepted from hardware verification engine 32. The hardware signature list of verified hardware components is then saved to the associated information handling system 10 as a hardware signature 36. For instance, hardware signature 36 is saved to hard disc drive 18 or other storage medium, such as firmware within the BIOS. The manufacture process then continues with testing of the hardware components through a hardware extended test engine 38. Hardware extended test engine 38 tests individual hardware components for proper operation and allows failed hardware components to be replaced before the manufacture process continues. After the hardware extended test is completed, a hardware signature compare engine tests information handling system 10 to ensure that any replaced hardware components remain consistent with the verified hardware components. Hardware signature compare engine 40 queries the hardware components, such as with system calls, to generate a current hardware signature list based on the replies to the queries. The current hardware signature list is compared with the saved list from hardware signature 36 and a fault is issued if differences between the lists are detected. If a fault issues, hardware signature 36 is corrupted so that the manufacture process will not continue and the information handling system returns to hardware verification engine 32 for re-verification of the hardware with manifest 12.

If hardware signature compare engine 40 determines that the current hardware components match the verified components listed in hardware signature 36, then the manufacture process is allowed to continue for installation of software by image engine 42. A match of the current hardware retrieved from system calls with hardware from hardware signature 36 confirms that the current hardware matches verified hardware without delaying the manufacture process by performing an additional verification of the current hardware versus manifest 12. This indirect verification helps to ensure that the software loaded by image engine 42 will be consistent with the current hardware components. After completion of the loading of software by image engine 42, hardware signature compare engine 40 again queries the current hardware components with system calls and compares the responding hardware components with hardware signature 36. If the current hardware components match the hardware signature, then a final test engine 44 performs a final test of the completed information handling system 10. If the current hardware components do not match hardware signature 36, then hardware signature compare engine 40 corrupts hardware signature 36 and returns information handling system 10 to hardware verification engine 32 for re-verification of the hardware components to manifest 12. To enforce compliance with the use of hardware signature 36, both image engine 42 and final test engine 44 require a non-corrupted hardware signature before proceeding with their respective operations on an information handling system 10.

Figure 2:
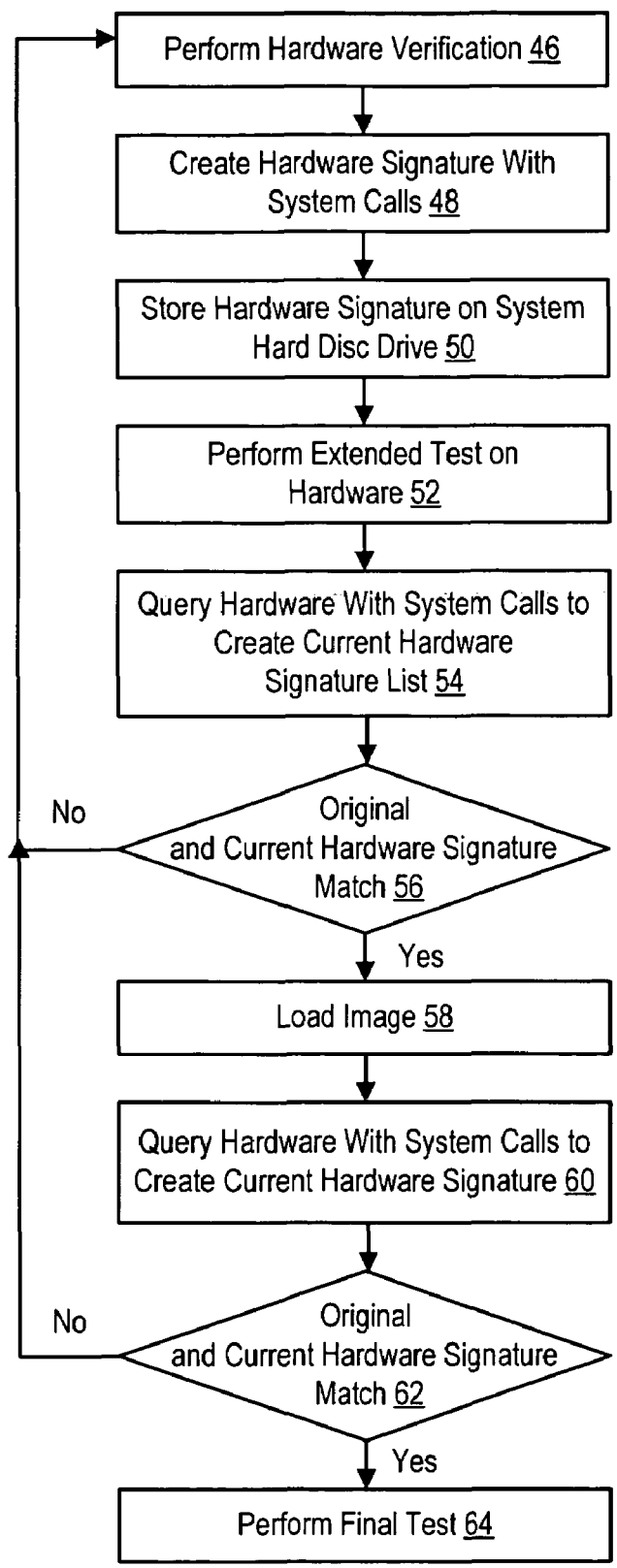
FIG. 2 depicts a flow diagram of a process for manufacture of an information handling system by reference to a hardware signature.

Referring now to FIG. 2, a flow diagram depicts a process for manufacture of an information handling system by reference to a hardware signature. The process begins at step 46 with performance of a hardware verification to confirm that the hardware matches the manifest for the information handling system. Once the hardware is verified, the process continues to step 48 to create a hardware signature with system calls to the various hardware components. The hardware signature is essentially a list of verified hardware components. At step 50, the hardware signature is stored on the information handling system hard disc drive or other storage space. At step 52, an extended test of the hardware components is performed to detect any having failures or unacceptable performance. Identified deficiencies are corrected by replacement of the hardware component with a replacement component.

After completion of the extended hardware tests, the process continues to step 54 at which the hardware components are queried with system calls to create a current hardware signature list. At step 56, the original hardware signature is compared with the current hardware signature to determine whether a match exists. If the original and current lists do not match, then a missing or incorrect hardware component is indicated and the process returns to step 46 for re-verification of the hardware components. If the original and current lists do match, the process continues to step 58 for loading of an image. After the image is loaded, the process continues to step 60 for another query of the hardware components to compare the current hardware signature with the stored hardware signature. If at step 62 the current and original hardware signatures fail to match, the process returns to step 46 for re-verification of the hardware. If at step 62 the current and original hardware signatures do match, the process continues to step 64 for final testing of the information handling system. Confirmation of the hardware configuration as the verified configuration by comparison with the hardware signature involves less time than re-verification of the hardware components.

Although the present invention has been described in detail, it should be understood that various changes, substitutions and alterations can be made hereto without departing from the spirit and scope of the invention as defined by the appended claims.

What is claimed is:

1. A method for manufacture of an information handling system having a predetermined configuration of plural hardware components based on a customer order, the method comprising:
   verifying that the plural hardware components have the predetermined configuration;
   creating a hardware signature representing the plural hardware components;
   storing the hardware signature;
   testing the hardware components;
   querying the hardware components to create a current hardware signature;
   comparing the current hardware signature with the stored hardware signature to determine whether the current hardware configuration has the predetermined configuration;
   detecting a difference between the stored hardware signature and the current hardware signature; and
   corrupting the stored hardware signature to indicate that verifying the hardware components is required.

2. The method of claim 1 further comprising:
   determining that the current hardware configuration differs from the predetermined configuration; and
   returning to verifying that the plural hardware components have the predetermined configuration.

3. The method of claim 1 further comprising:
   determining that the current hardware configuration matches the predetermined configuration;
   installing an image on the information handling system;
   querying the hardware components to create a current hardware signature; and
   comparing the current hardware signature with the stored hardware signature to determine whether the current hardware configuration has the predetermined configuration.

4. The method of claim 3 further comprising:
   determining that the current hardware configuration differs from the predetermined configuration; and
   returning to verifying that the plural hardware components have the predetermined configuration.

5. The method of claim 3 further comprising:
   determining that the current hardware configuration matches the predetermined configuration;
   performing final system tests on the information handling system; and
   shipping the information handling system to the customer.

6. The method of claim 1 wherein storing the hardware signature further comprises storing the hardware signature on a hard disc drive of the information handling system.

7. The method of claim 1 wherein querying the hardware components further comprises sending system calls to the hardware components.

8. The method of claim 1 wherein creating the hardware signature further comprises querying the hardware components by sending system calls to the hardware components.

9. A system for manufacture of information handling systems, each information handling system having a configuration of plural hardware components, the system comprising:

a hardware verification engine operable to verify that the plural hardware components of an information handling system match a predetermined configuration;

a hardware signature engine operable to compile a hardware signature listing the verified hardware components and to store the hardware signature on the information handling system;

a hardware extended test engine operable to detect failures associated with the hardware components; and a hardware signature compare engine operable to query the plural hardware components and compare the queried components with the hardware signature, the hardware signature compare engine issuing a fault if the queried components fail to match the hardware signatures;

wherein the hardware signature compare engine is further operable to corrupt the hardware signature if the queried hardware components fail to match the hardware signature, the corrupted hardware signature indicating that hardware verification is required.

10. The system of claim 9 further comprising:
an image engine operable to install an image on the information handling system; and
a final test engine operable to test the information handling system with the image installed;
wherein the hardware signature compare engine is further operable prevent the image engine from installing the image if the queried components fail to match the hardware signature.

11. The system of claim 9 wherein the hardware signature engine compiles the hardware signature list by performing a system call to each hardware component.

12. The system of claim 9 wherein the hardware signature engine compiles the hardware signature from the predetermined configuration.

13. The system of claim 9 wherein the predetermined configuration is a customer build-to-order manifest.

14. The system of claim 9 wherein the hardware signature compare engine queries the plural hardware components with system calls.

* * * * *

UNITED STATES PATENT AND TRADEMARK OFFICE
CERTIFICATE OF CORRECTION

PATENT NO. : 7,577,828 B2  Page 1 of 1
APPLICATION NO. : 11/035910
DATED : August 18, 2009
INVENTOR(S) : Sammer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Seventh Day of September, 2010

David J. Kappos
*Director of the United States Patent and Trademark Office*